United States Patent [19]

Hammond

[11] 3,927,033

[45] Dec. 16, 1975

[54] LASING DYE AND METHOD OF PREPARATION

[75] Inventor: Peter R. Hammond, China Lake, Calif.

[73] Assignees: Peter R. Hammond, China Lake, Calif.; The United States of America as represented by the Secretary of the Navy, Washington, D.C.

[22] Filed: Nov. 25, 1974

[21] Appl. No.: 526,760

[52] U.S. Cl. .......................... 260/343.2 R; 331/94.5
[51] Int. Cl.² ....................................... C07D 311/16
[58] Field of Search ............................. 260/343.2 R

[56] References Cited
UNITED STATES PATENTS

| | | | |
|---|---|---|---|
| 2,647,133 | 7/1953 | Long et al. | 260/343.2 |
| 2,680,747 | 6/1954 | Williams et al. | 260/343.2 |
| 3,521,187 | 7/1970 | Snavely et al. | 260/343.2 |

OTHER PUBLICATIONS

Drake (ex.), Org. Synthesis, Vol. 21 (1941), pp. 22,23.

*Primary Examiner*—James A. Patten
*Attorney, Agent, or Firm*—R. S. Sciascia; Roy Miller; Lloyd E. K. Pohl

[57] ABSTRACT

4-Trifluoromethyl-7-hydroxycoumarin is prepared and disclosed as being useful as a lasing dye in the green to blue-green regions.

3 Claims, No Drawings

LASING DYE AND METHOD OF PREPARATION

BACKGROUND OF THE INVENTION

1. Field of the Invention.

This invention relates to materials which are useful as lasing dyes.

2. Description of the Prior Art.

Coumarins are a well known class of compounds. However, to the best of the inventor's knowledge, the coumarin disclosed herein has never been prepared before. Naturally, since the inventor has no knowledge of the herein disclosed compound's preparation, the inventor also has no knowledge of any previous disclosure of the compound's usefulness as a lasing dye.

SUMMARY OF THE INVENTION

The compound disclosed herein is 4-trifluoromethyl-7-hydroxycoumarin. It is prepared by reacting resorcinol and ethyl 4,4,4-trifluoroacetoacetate.

DESCRIPTION OF THE PREFERRED EMBODIMENT

4-Trifluoromethyl-7-hydroxycoumarin may be prepared according to the following example:

EXAMPLE 1

Resorcinol (5.5g./.05 mole) and ethyl 4,4,4-trifluoroacetoacetate (9.2g./.05 mole) were dissolved in 20 ml of dry benzene. Phosphoryl chloride catalyst (2 ml) was added. The reaction mixture was refluxed for 5 hours and then allowed to cool to room temperature. The solid reaction product was filtered from the reaction mixture and recrystallized from a 50—50 by volume dioxane-water mixture. The thus recrystallized product proved to be, upon NMR and elemental analysis, 4-trifluoromethyl-7-hydroxycoumarin.

Anal: Calcd. C 52.2, H 2.18, F 24.8; Found, C 52.4, H 2.27, F 25.00. Melting point = 183.0° to 184.0°C.

Testing of 4-trifluoromethyl-7-hydroxycoumarin for its lasing properties was carried out according to the following example:

EXAMPLE 2

Enough 4-trifluoromethyl-7-hydroxycoumarin to form a $10^{-3}$ molar solution was placed in water and the water was slowly heated to ensure complete solution. After heating for a few minutes, the solution was allowed to cool to room temperature. A portion of the $10^{-3}$ molar solution was then placed in an Avco-Everett "Dial-a-Line" nitrogen laser and was found to lase in the green region.

4-Trifluoromethyl-7-hydroxycoumarin can be made to lase in the blue-green region as well as the green by tuning with the aid of a diffraction grating.

What is claimed is:

1. 4-Trifluoromethyl-7-hydroxycoumarin.

2. A method for preparing 4-trifluoromethyl-7-hydroxycoumarin comprising the steps of:
   a. dissolving equimolar amounts of resorcinol and ethyl 4,4,4-trifluoroacetoacetate in dry benzene;
   b. adding phosphoryl chloride catalyst; and
   c. refluxing.

3. The method according to claim 2 wherein the refluxing step is carried out for 5 hours.

* * * * *